United States Patent
Guen

(10) Patent No.: US 10,840,498 B2
(45) Date of Patent: Nov. 17, 2020

(54) SECONDARY BATTERY

(71) Applicant: SAMSUNG SDI CO., LTD., Yongin-si (KR)

(72) Inventor: Minhyung Guen, Yongin-si (KR)

(73) Assignee: Samsung SDI Co., Ltd., Yongin-Si (KR)

( * ) Notice: Subject to any disclaimer, the term of this patent is extended or adjusted under 35 U.S.C. 154(b) by 933 days.

(21) Appl. No.: 15/147,414

(22) Filed: May 5, 2016

(65) Prior Publication Data

US 2017/0098816 A1  Apr. 6, 2017

(30) Foreign Application Priority Data

Oct. 2, 2015 (KR) .................. 10-2015-0139030

(51) Int. Cl.
*H01M 10/04* (2006.01)
*H01M 2/02* (2006.01)
*H01M 2/04* (2006.01)
*H01M 2/30* (2006.01)
*H01M 2/36* (2006.01)
*H01M 2/18* (2006.01)
*H01M 2/10* (2006.01)

(52) U.S. Cl.
CPC ........... *H01M 2/361* (2013.01); *H01M 2/024* (2013.01); *H01M 2/0217* (2013.01); *H01M 2/043* (2013.01); *H01M 2/0404* (2013.01); *H01M 2/0473* (2013.01); *H01M 2/1061* (2013.01); *H01M 2/1072* (2013.01); *H01M 2/18* (2013.01); *H01M 2/30* (2013.01); *H01M 2/305* (2013.01); *H01M 2/362* (2013.01); *H01M 10/0413* (2013.01); *H01M 10/0431* (2013.01); *H01M 2220/20* (2013.01); *H01M 2220/30* (2013.01)

(58) Field of Classification Search
CPC ........ H01M 2/36; H01M 2/361; H01M 2/362; H01M 2/18; H01M 2/0217; H01M 2/024; H01M 2/0404; H01M 2/043; H01M 2/0473; H01M 2/1061; H01M 2/1072; H01M 2/30; H01M 2/305; H01M 10/0413; H01M 10/0431; H01M 2220/20; H01M 2220/30

See application file for complete search history.

(56) References Cited

U.S. PATENT DOCUMENTS

2006/0092593 A1* 5/2006 Viavattine ............... H01M 2/22
                                                          361/303
2012/0052371 A1* 3/2012 Kim ....................... H01M 2/027
                                                          429/179

FOREIGN PATENT DOCUMENTS

| JP | 2005158649 A * | 6/2005 |
| JP | 2008-117605 A | 5/2008 |
| JP | 2014-078438 A | 5/2014 |
| JP | 2015-076293 A | 4/2015 |
| KR | 2007-0071244 A | 7/2007 |

OTHER PUBLICATIONS

Takaishi et al., Machine translation of JP-2005158649-A, Jun. 2005, obtained form espacenet.com (Year: 2005).*

Meguid, S.A., Finite element analysis of defence hole systems for the reduction of stress concentration in a uniaxially-loaded plate with two coaxial holes, 1986, Engineering Fracture Mechanics, 25(4):403-413 (Year: 1986).*

Traiviratana Etal.,Void growth in metals: Atomistic calculations, 2008, Acta Materialia (Year: 2008).*

* cited by examiner

Primary Examiner — Muhammad S Siddiquee
(74) Attorney, Agent, or Firm — Lee IP Law, PC

(57) ABSTRACT

Disclosed is a secondary battery, which can minimize occurrence of a short-circuit between a cap plate and an electrode assembly while maximizing the size of an electrolyte injection hole of an inner case. The secondary battery includes at least one electrode assembly, an insulating inner case accommodating the electrode assembly, an outer case accommodating the electrode assembly and the inner case, and a cap plate sealing an opening of the outer case, wherein the inner case has a top surface corresponding to the cap plate and an injection hole for electrolyte injection located in the top surface.

4 Claims, 8 Drawing Sheets

SECONDARY BATTERY

CROSS-REFERENCE TO RELATED APPLICATION

Korean Patent Application No. 10-2015-0139030, filed on Oct. 2, 2015, in the Korean Intellectual Property Office, and entitled: "Secondary Battery," is incorporated by reference herein in its entirety.

BACKGROUND

1. Field

The example embodiments relate to a secondary battery.

2. Description of the Related Art

A secondary battery can be repeatedly charged and discharged, unlike a primary battery which cannot be recharged. Low capacity batteries that use single battery cells are used as power sources for various portable small-sized electronic devices, such as cellular phones and camcorders. High power batteries that use tens of battery cells connected to each other in a battery pack are used as power sources for hybrid vehicles or the like.

Secondary batteries are manufactured in various shapes such as a cylindrical shape or a prismatic shape. A secondary battery is generally constructed by forming an electrode assembly having a separator as an insulator between a positive electrode plate and a negative electrode plate and accommodating the electrode assembly in a case together with electrolyte. The electrode assembly is connected to electrode terminals which protrude from a cap plate and are exposed to the exterior of the secondary battery.

SUMMARY

According to an aspect of the example embodiment, there is provided a secondary battery including at least one electrode assembly, an insulating inner case accommodating the electrode assembly, an outer case accommodating the electrode assembly and the inner case, and a cap plate sealing an opening of the outer case, wherein the inner case has a top surface corresponding to the cap plate, and an injection hole for electrolyte injection located in the top surface.

The inner case may include a pair of long side surfaces extending from the top surface, a pair of short side surfaces extending from opposite ends of the long side surfaces and bottom surfaces extending from the long side surfaces so as to face the top surface to surround the entire outer surface of the electrode assembly.

The injection hole may include a plurality of holes spaced apart from each other.

The plurality of holes may include different size holes.

In addition, the injection hole may downwardly protrude so as to have a predetermined depth from the top surface.

Further, the injection hole may include a sidewall portion extending from the top surface to an interior side of the inner case and a bottom portion extending from the sidewall portion to an interior side of the injection hole.

At least one cutting portion may be located in the top surface adjacent to the injection hole and may extend along the sidewall portion and along the bottom portion.

A diameter of the injection hole corresponding to the top surface of the inner case may be larger than a diameter of the bottom portion of the injection hole.

A first electrode tab hole and a second electrode tab hole may be located in the top surface of the inner case, and a first electrode tab and a second electrode tab of the electrode assembly may be drawn out from the first electrode tab hole and the second electrode tab hole, respectively.

An electrolyte injection hole may be located at a position corresponding to an injection hole of the cap plate.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
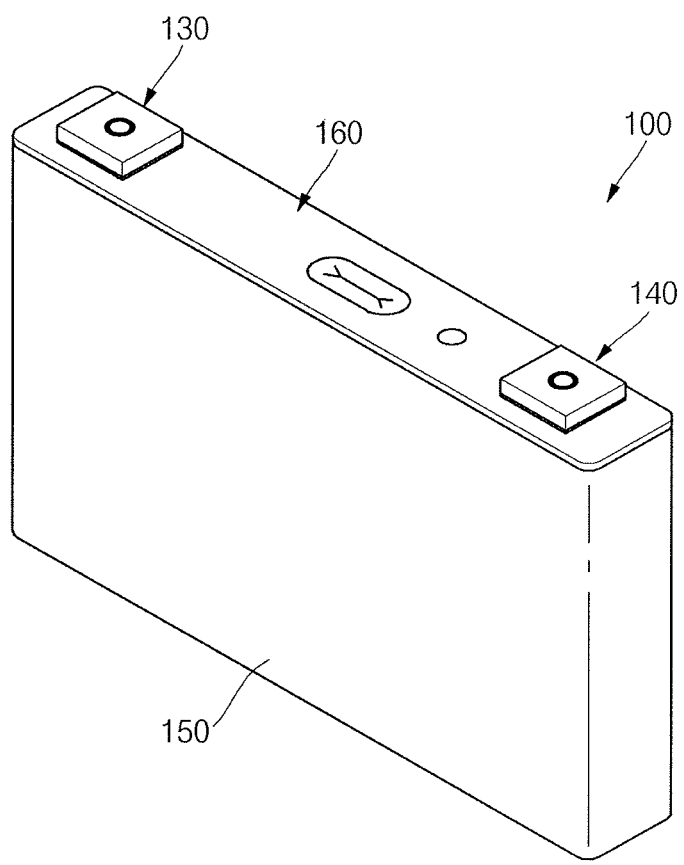
FIG. 1 illustrates a perspective view of a secondary battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. It will also be understood that when an element is referred to as "bent," this expression does not limit the configuration to an element formed or shaped by a bending process, but includes any such angled, curved, or similarly shaped configuration created by any suitable process. As used herein, the term "and/or" includes any and all combinations of one or more of the associated listed items. Like reference numerals refer to like elements throughout.

In addition, the terminology used herein is for the purpose of describing particular embodiments only and is not intended to be limiting thereof. As used herein, the singular forms are intended to include the plural forms as well, unless the context clearly indicates otherwise. It will be further understood that the terms "comprises" and/or "comprising,"

specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer, and/or section from another. Thus, for example, a first member, a first element, a first region, a first layer and/or a first section discussed below could be termed a second member, a second element, a second region, a second layer and/or a second section without departing from the teachings.

Figure 2:
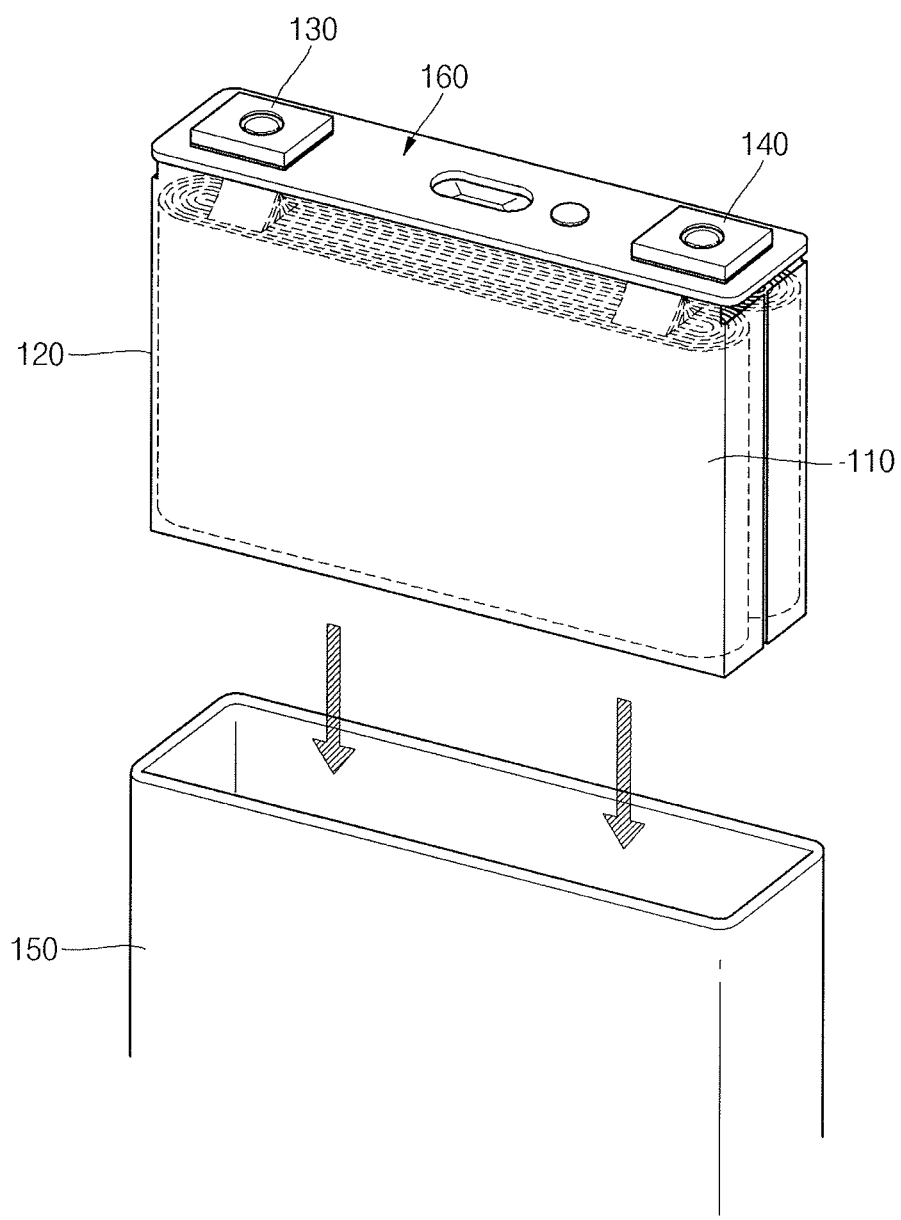
FIG. 2 illustrates an exploded perspective view of the secondary battery shown in FIG. 1.
Figure 3:
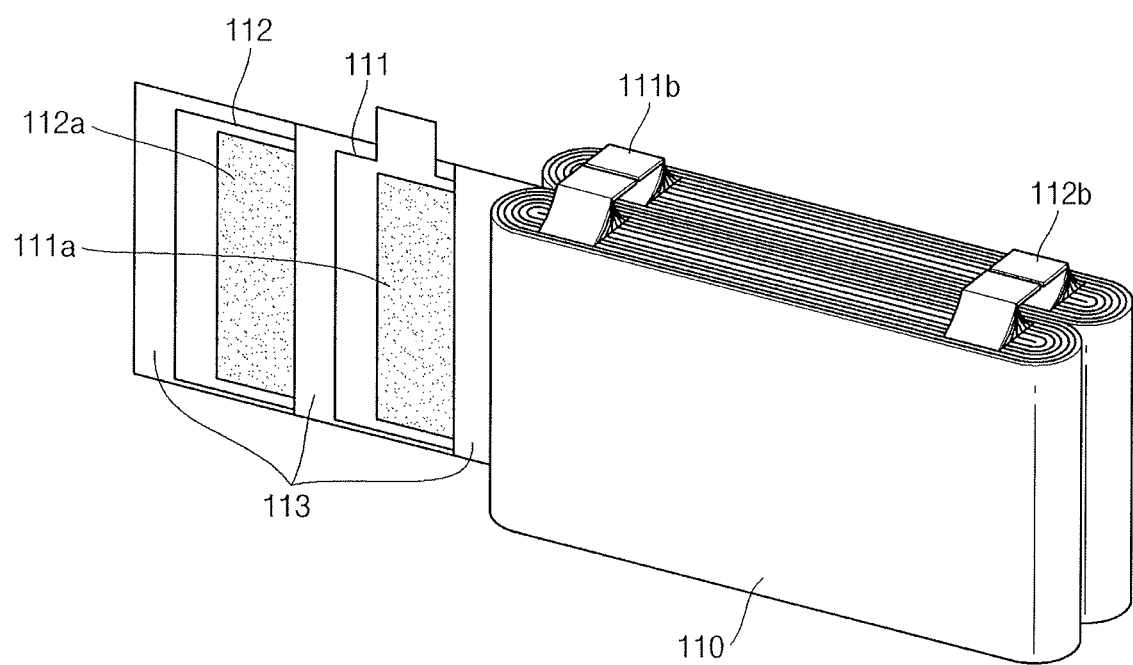
FIG. 3 illustrates an exploded perspective view of an electrode assembly in the secondary battery shown in FIG. 1.
Figure 4:
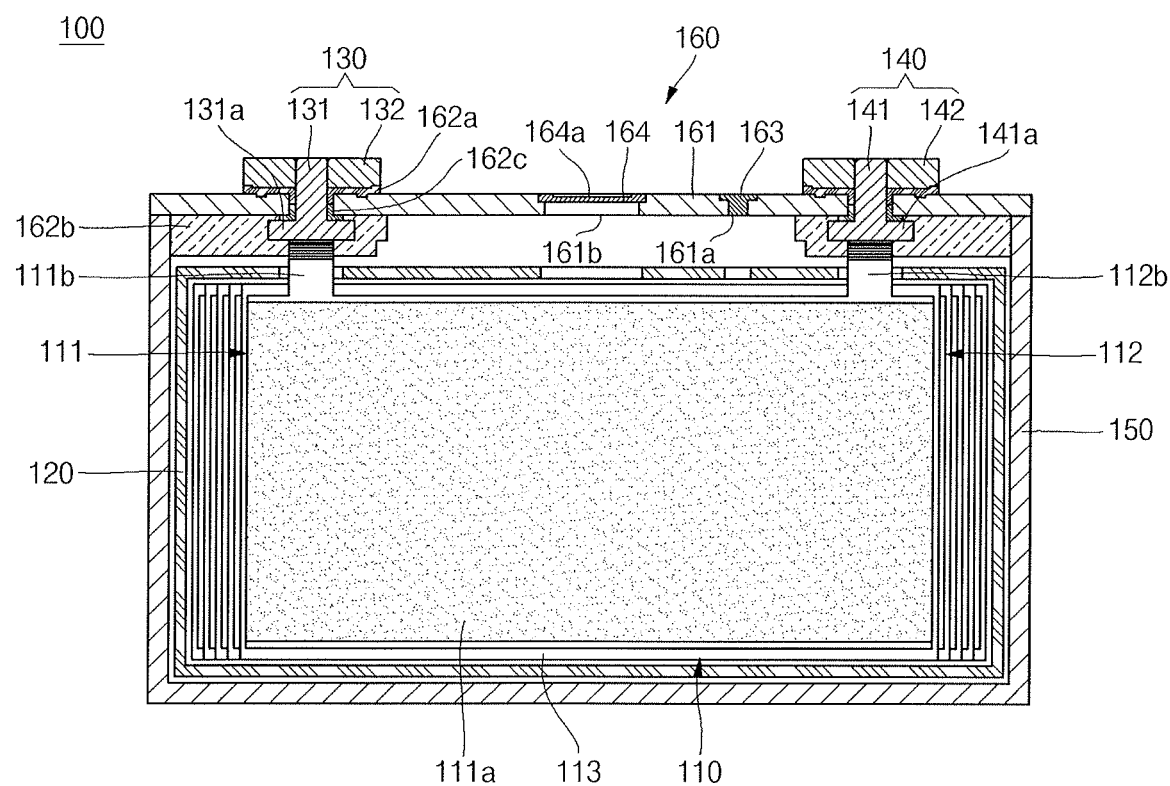
FIG. 4 illustrates a cross-sectional view of the secondary battery shown in FIG. 1.
Figure 5:
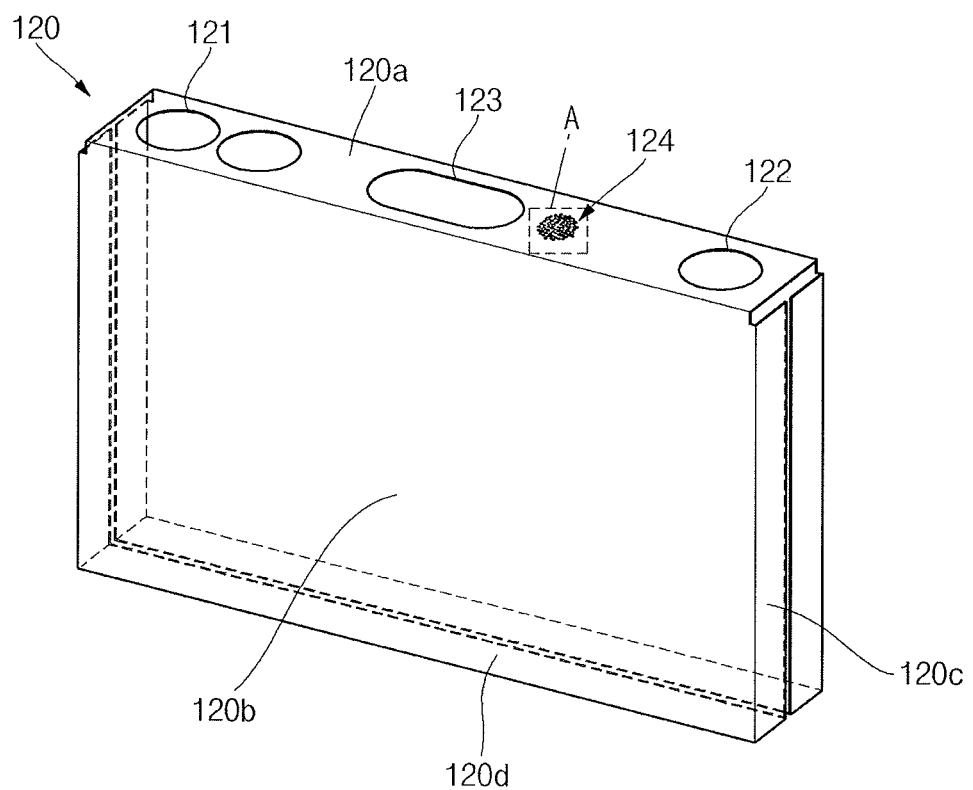
FIG. 5 illustrates a perspective view of an inner case in the secondary battery shown in FIG. 1.
Figure 6:
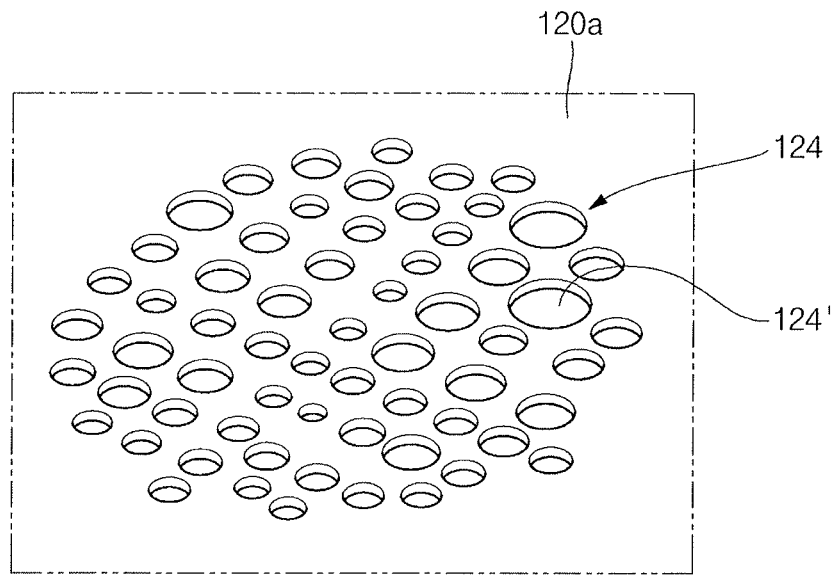
FIG. 6 illustrates an enlarged perspective view of a portion 'A' of FIG. 5.

FIG. 1 is a perspective view of a secondary battery according to an embodiment, FIG. 2 is an exploded perspective view of the secondary battery shown in FIG. 1, FIG. 3 is an exploded perspective view of an electrode assembly in the secondary battery shown in FIG. 1, FIG. 4 is a cross-sectional view of the secondary battery shown in FIG. 1, FIG. 5 is a perspective view of an inner case in the secondary battery shown in FIG. 1, and FIG. 6 is an enlarged perspective view of a portion 'B' of FIG. 5.

Referring to FIGS. 1 to 6, the secondary battery 100 according to an embodiment includes at least one electrode assembly 110, an inner case 120, a first terminal 130, a second terminal 140, an outer case 150 and a cap assembly 160.

The electrode assembly 110 is formed by winding or laminating a stacked structure of a first electrode plate 111, a second electrode plate 112 and a separator 113 interposed therebetween, which are thin plates or layers. Here, the first electrode plate 111 may serve as a negative electrode, for example, and the second electrode plate 112 may serve as a positive electrode, for example, or vice versa. The electrode assembly 110 may include at least one electrode assembly. In the illustrated embodiment, the electrode assembly 110 includes two electrode assemblies, but aspects of the assembly are not limited thereto.

The first electrode plate 111 is formed by coating a first electrode active material, such as graphite or carbon, on a first electrode current collector made of a metal foil, such as copper (Cu) or nickel (Ni). The first electrode plate 111 includes a first electrode active material layer 111a with the first electrode active material coated thereon, and a first electrode uncoated portion without the first electrode active material coated thereon. The first electrode uncoated portion becomes a path for the flow of current between the first electrode plate 111 and an outside of the first electrode plate 111, but aspects of the electrode plate are not limited to the materials of the first electrode plate 111 disclosed herein.

The second electrode plate 112 is formed by coating a second electrode active material, such as a transition metal oxide, on a second electrode current collector made of a metal foil, such as an aluminum (Al) foil. The second electrode plate 112 includes a second electrode active material layer 112a with the second electrode active material coated thereon, and a second electrode uncoated portion without the second electrode active material coated thereon. The second electrode uncoated portion becomes a path for the flow of current between the second electrode plate 112 and an outside of the second electrode plate 112, but aspects of the electrode plate are not limited to the materials of the second electrode plate 112 disclosed herein.

Here, polarities of the first electrode plate 111 and the second electrode plate 112 may be reversed.

The separator 113 may be positioned between the first electrode plate 111 and the second electrode plate 112 to prevent a short-circuit from occurring between the first electrode plate 111 and the second electrode plate 112 and to allow movement of lithium ions. In addition, the separator 113 may be made of polyethylene (PE), polypropylene (PP) and/or a composite film of polyethylene (PE) and polypropylene (PP), but aspects of the separator are not limited to the materials of the separator 113 disclosed herein.

The electrode assembly 110 is accommodated in the outer case 150 together with an electrolyte. The electrolyte may include an organic solvent dissolved in an organic solvent, for example, and may exist in liquid, solid or gel phase.

A first electrode tab 111b and a second electrode tab 112b may be connected to one or more locations of the first electrode plate 111 and the second electrode plate 112, respectively. In more detail, the first electrode tab 111b is interposed between the electrode assembly 110 and the first terminal 130, and the second electrode tab 112b is interposed between the electrode assembly 110 and the second terminal 140. Throughout the specification, the first electrode tab 111b and the second electrode tab 112b may be collectively referred to as electrode tabs 111b and 112b.

The first electrode tab 111b may be a region of the first electrode plate 111 of the electrode assembly 110, corresponding to the first electrode uncoated portion itself, which is not coated with a first active material 111a, or a separate member connected to the first electrode uncoated portion. In addition, the second electrode tab 112b may be a region of the second electrode plate 112 of the electrode assembly 110, corresponding to the second electrode uncoated portion itself, which is not coated with a second active material 112a, or a separate member connected to the second electrode uncoated portion. Here, the first and second electrode tabs 111b and 112b are the first electrode uncoated portion and the second electrode uncoated portion of the first electrode plate 111 and the second electrode plate 112, respectively, but aspects of the electrode tabs are not limited thereto.

The first electrode tab 111b extends from a top end of the electrode assembly 110 to a bottom end of the first terminal 130, to be described later, and the second electrode tab 112b extends from the top end of the electrode assembly 110 to a bottom end of the second terminal 140, to be described later. The first electrode tab 111b and the second electrode tab 112b are directly electrically connected or welded to the first terminal 130 and the second terminal 140, respectively.

In a high-capacity, high-output battery, a plurality of electrode tabs 111b and 112b extend from the electrode assembly 110, thereby obtaining high output current capacity. In addition, the electrode tabs 111b and 112b of the electrode assembly 110 may be directly electrically connected to the electrode terminals, which may shorten electric paths, thereby simplifying the process of electrically connecting the electrode assembly and the electrode terminals, lowering internal resistance of the secondary battery and reducing the number of components. In addition, since a winding axis of the electrode assembly 110 and terminal axes of the first and second terminals 130 and 140 are parallel or level with each other, the electrode assembly may exhibit high electrolyte impregnating capability during electrolyte injection and may allow internal gases to rapidly move to a safety vent in an event of over-charge so that the safety vent is rapidly actuated.

The inner case 120 accommodates the electrode assembly 110 therein. The inner case 120 is made of an insulating material and electrically insulates the electrode assembly 110 from the outer case 150 and/or the cap plate 161.

The inner case 120 includes a top surface 120*a* facing the cap plate 161, to be described later, a pair of long side surfaces 120*b* bent from a pair of relatively long sides of the top surface 120*a*, a pair of short side surfaces 120*c* bent from opposite ends of the long side surfaces 120*b*, and bottom surfaces 120*d* bent from the long side surfaces 120*b*, so as to face the top surface 120*a*. That is to say, the inner case 120 includes the pair of long side surfaces 120*b*, the pair of short side surfaces 120*c*, and the bottom surfaces 120*d* symmetrically disposed at opposite sides of the top surface 120*a*.

In other words, the top surface 120*a*, the long side surface 120*b*, the pair of short side surfaces 120*c* and the bottom surface 120*d*, which are positioned at one side of the inner case 120, constitute a first region of the inner case 120, and the top surface 120*a*, the long side surface 120*b*, the pair of short side surfaces 120*c* and the bottom surface 120*d*, which are positioned at the other side of the inner case 120, constitute a second region of the inner case 120. At an initial stage, the top surface 120*a* and the pair of long side surfaces 120*b* of the inner case 120 may be aligned with and parallel to each other. Then, the electrode assemblies 110 are accommodated in the first and second regions of the inner case 120 and boundary regions between the top surface 120*a* and the long side surfaces 120*b* are bent, thereby allowing the inner case 120 to surround the entire outer surface of the electrode assemblies 110. Thereafter, the inner case 120 and the electrode assemblies 110 accommodated in the inner case 120 are accommodated in the outer case 150.

Of course, the example embodiment does not limit the number of electrode assemblies 110 as long as at least one electrode assembly 110 is provided. In addition, the example embodiment does not limit the configuration of the inner case 120 to that disclosed herein, but the inner case 120 may have any configuration as long as it is capable of accommodating an electrode assembly 110 therein.

The top surface 120*a* of the inner case 120 includes a first electrode tab hole 121, a second electrode tab hole 122, a vent hole 123 and an injection hole 124.

The first electrode tab 111*b* of the electrode assembly 110 passes through the first electrode tab hole 121. The first electrode tab 111*b* is drawn from the inner case 120 to the outside of the inner case 120 through the first electrode tab hole 121 to be connected to the first terminal 130.

The second electrode tab 112*b* of the electrode assembly 110 passes through the second electrode tab hole 122. The second electrode tab 112*b* is drawn from the inner case 120 to the outside of the inner case 120 through the second electrode tab hole 122 to be connected to the second terminal 140.

The vent hole 123 is located at a position corresponding to a vent hole 161*b* of the cap assembly 160, to be described later. Gases generated by the use of the electrode assembly 110 may be released from the inner case 120 through the vent hole 123. In addition, a safety vent 164 of the cap assembly 160 may be actuated by the vent hole 123.

The injection hole 124 is located at a position corresponding to an electrolyte injection hole 161*a* of the cap assembly 160. The electrolyte injected into the electrolyte injection hole 161*a* penetrates into the injection hole 124 to impregnate the electrode assembly 110 provided in the inner case 120.

Referring to FIG. 6, the injection hole 124, which is porous, may include a plurality of holes 124'. Here, the holes 124' may have different sizes, as shown in FIG. 6. Of course, the injection hole 124 may include a plurality of holes having the same size.

As the size of the injection hole 124 increases, electrolyte injection can be more smoothly performed. That is to say, as the size of the injection hole 124 increases, the electrolyte injected into the electrolyte injection hole 161*a* can be more accurately introduced into the electrode assembly 110 of the inner case 120, thereby improving the electrolyte impregnating of the electrode assembly 110. Here, when the size of the injection hole 124 is referred to as being large, it means that a total area occupied by the plurality of holes 124' is large. That is to say, the more the holes 124', the larger the injection hole 124 is. In addition, the larger the holes 124' are, the larger the injection hole 124 is.

Additionally, as the sizes of the holes 124' increase, a possibility of the electrode assembly 110 and the cap plate 161 contacting each other may be increased. That is to say, when the secondary battery 100 is deformed due to external impacts, it is possible to minimize contact between the electrode assembly 110 and the cap plate 161 by reducing the sizes of the holes 124', which tends to reduce deformation, thereby preventing a short-circuit from occurring between the electrode assembly 110 and the cap plate 161.

Since the injection hole 124 includes the plurality of holes 124', the overall area of the injection hole 124 can be maximized, thereby facilitating electrolyte injection. In addition, a short-circuit between the electrode assembly 110 and the cap plate 161 due to deformation of the secondary battery 100 can be prevented by minimizing the sizes of the respective holes 124'. That is to say, since the injection hole 124 is porous, it is possible to minimize contact between a top portion of the electrode assembly 110 accommodated in the inner case 120 and the cap plate 161 even if external impacts are applied to the secondary battery 100 during a safety evaluation or use of the secondary battery 100.

Therefore, the secondary battery 100 according to the example embodiment may have increased accuracy of electrolyte injection by maximizing the overall area of the injection hole 124 including the plurality of holes 124'. In addition, possibilities of the electrode plates 111 and 112 of the electrode assembly 110 and the cap plate 161 contacting each other are eliminated by having an injection hole 124 with porosity, thereby preventing a short-circuit between each of the electrode plates 111 and 112 of the electrode assembly 110 and the cap plate 161.

The first terminal 130 is electrically connected to the first electrode plate 111 and includes a first terminal pillar 131 and a first terminal plate 132.

The first terminal pillar 131 passes through the cap plate 161 and upwardly protrudes and extends a predetermined length. The first terminal pillar 131 is electrically connected to the first electrode tab 111*b* under the cap plate 161. In addition, the first terminal pillar 131 includes a flange 131*a* under the cap plate 161 to prevent the first terminal pillar 131 from being dislodged from the cap plate 161. In particular, the first electrode tab 111*b* is electrically connected or welded to the flange 131*a*. Meanwhile, the first terminal pillar 131 is electrically insulated from the cap plate 161.

The first terminal plate 132 includes a hole (not labeled) at its center. The first terminal pillar 131 is coupled and welded to the hole. That is to say, upwardly exposed boundary regions of the first terminal pillar 131 and the first terminal plate 132 are welded to each other. For example, laser beams may be applied to the upwardly exposed boundary regions of the first terminal pillar 131 and the first terminal plate 132, thereby melting and then cooling the boundary regions to be welded to each other.

The second terminal 140 is electrically connected to the second electrode plate 112 and includes a second terminal pillar 141 and a second terminal plate 142.

The second terminal pillar 141 passes through the cap plate 161 and upwardly protrudes and extends a predetermined length. The second terminal pillar 141 is electrically connected to the second electrode tab 112b under the cap plate 161. In addition, the second terminal pillar 141 includes a flange 141a under the cap plate 161 to prevent the second terminal pillar 141 from being dislodged from the cap plate 161. In particular, the second electrode tab 112b is electrically connected or welded to the flange 141a. Meanwhile, the second terminal pillar 141 is electrically insulated from the cap plate 161. Alternatively, the second terminal pillar 141 may be electrically connected to the cap plate 161.

The second terminal plate 142 includes a hole (not labeled). The second terminal pillar 141 is coupled and welded to the hole. That is to say, upwardly exposed boundary regions of the second terminal pillar 141 and the second terminal plate 142 are welded to each other. For example, laser beams may be applied to the upwardly exposed boundary regions of the second terminal pillar 141 and the second terminal plate 142, thereby melting and then cooling the boundary regions to be welded to each other.

The outer case 150 may be made of a conductive metal, such as aluminum, an aluminum alloy or a nickel plated steel, for example, and has a substantially hexahedral shape having an opening to receive the electrode assembly 110, the inner case 120, the first terminal 130 and the second terminal 140. That is to say, the outer case 150 includes two pairs of side portions spaced a predetermined distance apart from each other and facing each other, and a bottom portion at bottom portions of the two pairs of the side portions to be perpendicular to the two pairs of the side portions. The interior surface of the outer case 150 may be subjected to insulation treatment to be insulated from the electrode assembly 110, the first terminal 130, the second terminal 140 and the cap assembly 160. Of course, since the inner case 120 exists between the outer case 150 and the electrode assembly 110, the insulation treatment performed on the interior surface of the outer case 150 may be skipped.

The cap assembly 160 is coupled to the outer case 150. That is to say, the cap assembly 160 closes the opening of the outer case 150. In detail, the cap assembly 160 includes the cap plate 161, seal gaskets 162c, a plug 163, the safety vent 164, upper insulation members 162a and lower insulation members 162b.

The cap plate 161 closes the opening of the outer case 150 and may be made of the same material as the outer case 150. The cap plate 161 may be coupled to the outer case 150 by, for example, laser welding. Here, since the cap plate 161 and the second terminal 140 may have the same polarity, the cap plate 161 and the outer case 150 may also have the same polarity.

The cap plate 161 includes an electrolyte injection hole 161a corresponding to the injection hole 124 in the top surface 120a of the inner case 120 and a vent hole 161b corresponding to the vent hole 123 of the inner case 120.

The seal gasket 162c, made of an insulating material, is positioned between each of the first terminal pillar 131 and the second terminal pillar 141 and the cap plate 161 and seals portions between each of the first terminal pillar 131 and the second terminal pillar 141 and the cap plate 161. The seal gasket 162c may prevent external moisture from penetrating into the secondary battery 100 or may prevent electrolyte contained in the secondary battery 100 from flowing out.

The plug 163 seals the electrolyte injection hole 161a of the cap plate 161. That is to say, after the electrolyte is injected into the secondary battery 100 through the electrolyte injection hole 161a and the injection hole 124, the electrolyte injection hole 161a is sealed by the plug 163.

The safety vent 164 is located in the vent hole 161b of the cap plate 161 and has a notch 164a configured to be opened at a preset pressure.

The upper insulation member 162a is located between each of the first terminal pillar 131 and the second terminal pillar 141 and the cap plate 161. In addition, the upper insulation member 162a is brought into close contact with the cap plate 161, and may also be brought into close contact with the seal gasket 162c. Further, the upper insulation member 162a insulates the first terminal pillar 131 and the second terminal pillar 141 from the cap plate 161.

The lower insulation member 162b is positioned between each of the first electrode tab 111b and the second electrode tab 112b and the cap plate 161 and prevents unnecessary short-circuits from occurring therebetween. That is to say, the lower insulation member 162b prevents occurrences of a short-circuit between the first electrode tab 111b and the cap plate 161 and a short-circuit between the second electrode tab 112b and the cap plate 161.

When the cap plate 161 and the second terminal 140 have the same polarity, the seal gasket 162c, the upper insulation member 162a and the lower insulation member 162b may not be provided between the second terminal 140 and the cap plate 161.

As described above, since the secondary battery 100 according to an exemplary embodiment includes the insulating inner case 120 accommodating at least one electrode assembly 110, the electrode assembly 110, the first and second terminals 130 and 140, the outer case 150 and the cap plate 161 are electrically insulated from one another.

In addition, the injection hole 124 corresponding to the electrolyte injection hole 161a of the cap plate 161 is located in the top surface 120a of the inner case 120. Here, since the injection hole 124 is porous, it may include a plurality of fine holes 124'. That is to say, the porosity of the injection hole 124 improves the reliability of electrolyte injection by maximizing the size of the injection hole 124. In addition, a porous injection hole 124 may prevent the first and second electrode plates 111 and 112 of the electrode assembly 110 from deforming and making contact with the cap plate 161 even if the overall size of the injection hole 124 is increased, thereby preventing a short-circuit from occurring between the electrode assembly 110 and the cap plate 161.

Figure 7:
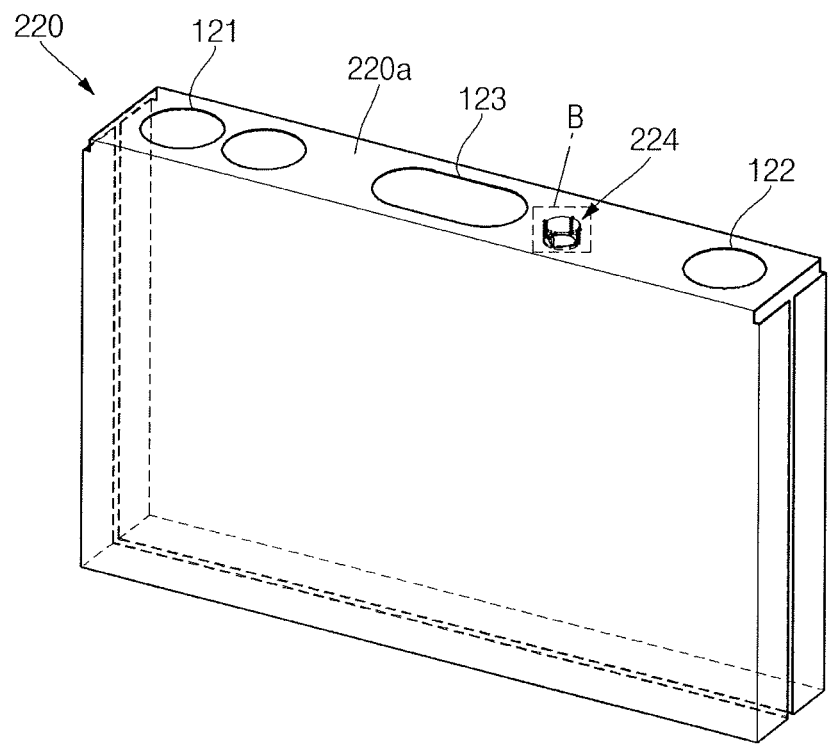
FIG. 7 illustrates a perspective view of an inner case in a secondary battery according to another embodiment.
Figure 8:
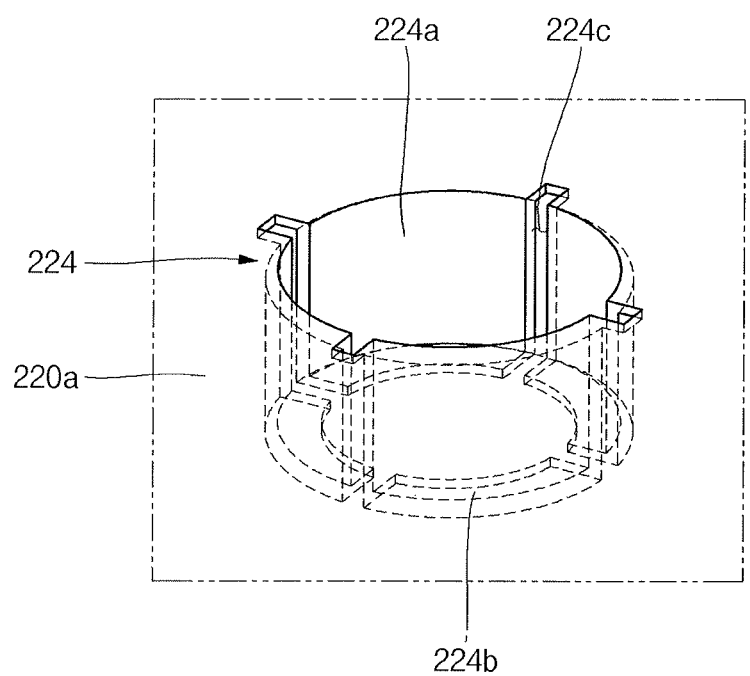
FIG. 8 illustrates an enlarged perspective view of a portion 'B' of FIG. 7.
Figure 9A:
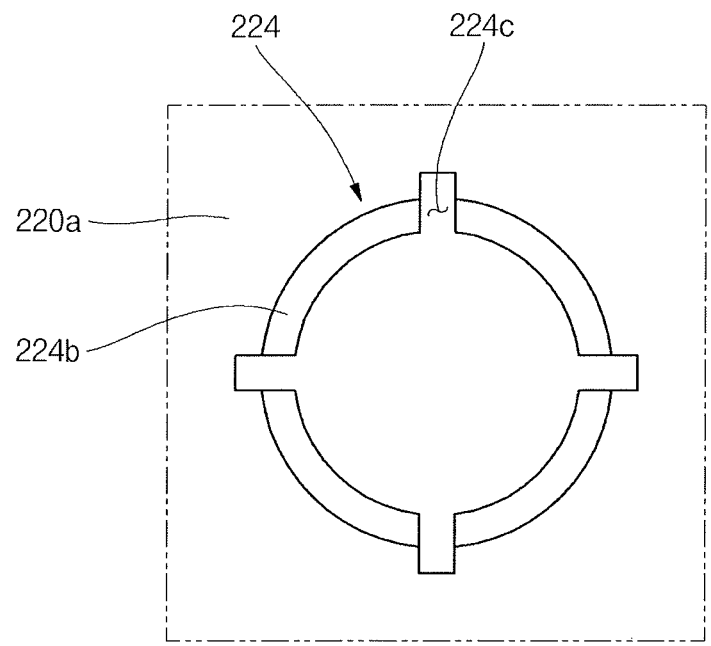
FIGS. 9A and 9B illustrate a plan view and a cross-sectional view of the portion 'B' of FIG. 7.
Figure 9B:
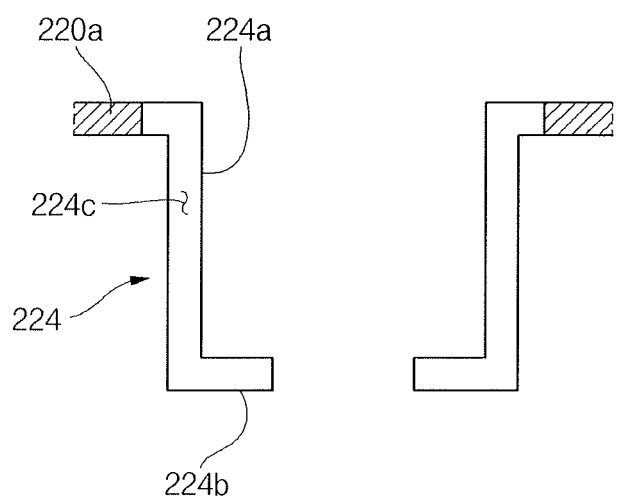

FIG. 7 is a perspective view of an inner case in a secondary battery according to another embodiment, FIG. 8 is an enlarged perspective view of a portion 'B' of FIG. 7, and FIGS. 9A and 9B are a plan view and a cross-sectional view of the portion 'B' of FIG. 7.

Referring to FIGS. 7 to 9B, in the secondary battery according to another embodiment, the inner case 220 includes a first electrode tab hole 121, a second electrode tab hole 122, a vent hole 123, and an injection hole 224 on top surface 220a. Although not shown, as disclosed in the previous embodiment, the inner case 220 accommodates an electrode assembly and is then accommodated in an outer case. The inner case 220 is made of an insulating material. Since the inner case 220 is substantially the same as the inner case 120 of the previous embodiment except for an injection hole 224, the following description will focus on the injection hole 224.

The injection hole 224 is located at a position corresponding to an electrolyte injection hole (161*a* of FIG. 4) of a cap plate (161 of FIG. 4). The injection hole 224 has a substantially cylindrical shape and downwardly protrudes from the top surface 220*a*, such that it has a predetermined depth. In detail, the injection hole 224 includes a sidewall portion 224*a* extending from the top surface 220*a* of the inner case 220 to an interior side of the inner case 220, and a bottom portion 224*b* extending from the sidewall portion 224*a* to an interior side of the injection hole 224 to form a hole of the bottom portion 224*b*. That is to say, a diameter of the injection hole 224 of the bottom portion 224*b* is smaller than a diameter of the injection hole 224 in the top surface 220*a*.

In addition, a plurality of cutting portions 224*c* are formed in the top surface 220*a* adjacent to the injection hole 224. In the illustrated embodiment, the cutting portion 224*c* includes four cutting portions, but aspects of the cutting portions are not limited thereto. The cutting portion 224*c* is formed to extend from the top surface 220*a* to the sidewall portion 224*a* and to a bottom portion 224*b*. That is to say, sections of the sidewall portion 224*a* and the bottom portion 224*b* are spaced apart from other sections of the sidewall portion 224*a* and the bottom portion 224*b* by the four cutting portions 224*c*.

An electrolyte passes the portion of injection hole 224 in the top surface 220*a* and is introduced into the inner case 220 through the hole in the bottom portion 224*b*. Therefore, accuracy of electrolyte injection can be improved by maximizing the diameter of the portion of injection hole 224 in the top surface 220*a* while reducing the diameter of the hole in the bottom portion 224*b* to reduce deformation of the secondary battery, thereby preventing a short-circuit between the electrode assembly and the cap plate.

In addition, even when the secondary battery according to another embodiment is deformed due to external impacts, a space in which the sidewall portion 224*a* and the bottom portion 224*b* move can be created by the cutting portion 224*c*. In other words, the space between the sidewall portion 224*a* and the bottom portion 224*b* created by the cutting portion 224*c* may permit the sidewall portion 224*a* and the bottom portion 224*b* to be flexibly deformed to counter the external impacts. Therefore, even if deformation may occur to the secondary battery, it is possible to effectively suppress contact between the electrode assembly and the cap plate by causing deformation of the sidewall portion 224*a* and the bottom portion 224*b*.

By way of summation and review, as described above, the secondary battery according to example embodiments can minimize occurrence of a short-circuit between a cap plate and an electrode assembly while improving the accuracy in electrolyte injection by maximizing the size of an electrolyte injection hole of an inner case.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery, comprising:
at least one electrode assembly;
an insulating inner case defining an interior region that accommodates the at least one electrode assembly;
an outer case accommodating the at least one electrode assembly and the inner case; and
a cap plate sealing an opening of the outer case,
wherein:
the inner case has a top surface corresponding to the cap plate and an injection hole for electrolyte injection located in the top surface,
the injection hole includes a cylindrical projection that protrudes from a bottom of the top surface of the inner case into the interior region, such that an endmost portion of the cylindrical projection is located in the interior region between the top surface of the inner case and the at least one electrode assembly, a diameter of the injection hole at the top surface of the inner case being larger than a diameter of a hole in the endmost portion of the cylindrical projection, and
a plurality of cutting portions are located in the top surface of the inner case adjacent to the injection hole and extend through the cylindrical projection such that the cutting portions separate the cylindrical projection into a plurality of sidewall portions, each sidewall portion having a bottom portion that forms part of the endmost portion of the cylindrical projection.

2. The secondary battery as claimed in claim 1, wherein the inner case includes a pair of long side surfaces extending from the top surface, a pair of short side surfaces extending from opposite ends of the long side surfaces, and bottom surfaces extending from the long side surfaces and facing the top surface to surround an entire outer surface of the electrode assembly, the top surface, the long side surfaces, and the bottom surfaces being formed of an integral insulating element, the bottom surfaces being formed by bending the integral insulating element from the long side surfaces, and the long side surfaces being formed by bending the integral insulating element from the top surface.

3. The secondary battery as claimed in claim 1, wherein a first electrode tab hole and a second electrode tab hole are located in the top surface of the inner case, and a first electrode tab and a second electrode tab of the electrode assembly are drawn out from the first electrode tab hole and the second electrode tab hole, respectively.

4. The secondary battery as claimed in claim 1, wherein the injection hole of the inner case is located at a position corresponding to an injection hole of the cap plate.

* * * * *